United States Patent
Hatanaka et al.

(10) Patent No.: US 12,345,475 B2
(45) Date of Patent: Jul. 1, 2025

(54) HEAT EXCHANGER CORE, HEAT EXCHANGER, AND METHOD OF PRODUCING HEAT EXCHANGER CORE

(71) Applicant: MITSUBISHI HEAVY INDUSTRIES, LTD., Tokyo (JP)

(72) Inventors: Masaya Hatanaka, Tokyo (JP); Hiroyuki Nakaharai, Tokyo (JP); Nobuhide Hara, Tokyo (JP); Yoichi Uefuji, Tokyo (JP); Shunsaku Eguchi, Tokyo (JP); Takuo Oda, Tokyo (JP); Koichi Tanimoto, Tokyo (JP); Masashi Kitamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 327 days.

(21) Appl. No.: 17/800,665

(22) PCT Filed: Feb. 24, 2021

(86) PCT No.: PCT/JP2021/006793
§ 371 (c)(1),
(2) Date: Aug. 18, 2022

(87) PCT Pub. No.: WO2021/172331
PCT Pub. Date: Sep. 2, 2021

(65) Prior Publication Data
US 2023/0349641 A1 Nov. 2, 2023

(30) Foreign Application Priority Data

Feb. 27, 2020 (JP) .................................. 2020-031513
Feb. 27, 2020 (JP) .................................. 2020-031525

(51) Int. Cl.
*F28D 7/16* (2006.01)
*F28F 9/02* (2006.01)
(Continued)

(52) U.S. Cl.
CPC ................. *F28D 7/16* (2013.01); *F28F 9/02* (2013.01); *B33Y 10/00* (2014.12); *B33Y 80/00* (2014.12)

(58) Field of Classification Search
CPC .............. F28D 7/16; F28F 9/02; B33Y 10/00; B33Y 80/00
See application file for complete search history.

(56) References Cited

U.S. PATENT DOCUMENTS 5,309,637 A 5/1994 Moriarty
5,941,303 A * 8/1999 Gowan ............... F28D 1/05383
165/174

(Continued)

FOREIGN PATENT DOCUMENTS

CN 1791781 A 6/2006
CN 102333607 A 1/2012
(Continued)

OTHER PUBLICATIONS

Translation of CN111065794, paragraph 96 (Year: 2020).*
(Continued)

*Primary Examiner* — Tho V Duong
(74) *Attorney, Agent, or Firm* — Birch, Stewart, Kolasch & Birch, LLP

(57) ABSTRACT

A heat exchanger core includes: a plurality of internal passages; and a header passage communicating with the plurality of internal passages. An inner wall of the header passage has greater surface roughness than passage walls of the plurality of internal passages.

24 Claims, 9 Drawing Sheets

(51) Int. Cl.
 *B33Y 10/00* (2015.01)
 *B33Y 80/00* (2015.01)

(56) References Cited

U.S. PATENT DOCUMENTS

| | | | | |
|---|---|---|---|---|
| 7,562,697 | B2* | 7/2009 | Gorbounov | F28F 9/0278 |
| | | | | 165/174 |
| 10,563,895 | B2* | 2/2020 | Mislak | F28F 9/028 |
| 10,859,327 | B2* | 12/2020 | Tsubota | F28F 9/18 |
| 2003/0155109 | A1* | 8/2003 | Kawakubo | F28F 9/185 |
| | | | | 165/173 |
| 2005/0133527 | A1 | 6/2005 | Dullea et al. | |
| 2007/0272175 | A1 | 11/2007 | Alcaine et al. | |
| 2008/0023183 | A1* | 1/2008 | Beamer | F28F 9/0273 |
| | | | | 165/174 |
| 2008/0141707 | A1* | 6/2008 | Knight | F28F 1/025 |
| | | | | 165/174 |
| 2012/0041586 | A1 | 2/2012 | Abe et al. | |
| 2017/0219302 | A1 | 8/2017 | Moriyama et al. | |
| 2018/0106534 | A1 | 4/2018 | Le Guludec et al. | |
| 2018/0283810 | A1* | 10/2018 | Mironets | B29C 64/153 |
| 2018/0345425 | A1 | 12/2018 | Caimano et al. | |
| 2020/0003497 | A1 | 1/2020 | Aston et al. | |
| 2020/0376552 | A1 | 12/2020 | Fukuda et al. | |
| 2021/0247140 | A1 | 8/2021 | Aston et al. | |

FOREIGN PATENT DOCUMENTS

| | | | | | |
|---|---|---|---|---|---|
| CN | 204830955 | U | | 12/2015 | |
| CN | 107388854 | A | | 11/2017 | |
| CN | 108819152 | A | | 11/2018 | |
| CN | 110662393 | A | * | 1/2020 | ............ B22F 10/00 |
| CN | 111065794 | A | * | 4/2020 | ............ B22F 10/20 |
| JP | 55-35808 | A | | 3/1980 | |
| JP | 2002-164066 | A | | 6/2002 | |
| JP | 2008-180428 | A | | 8/2008 | |
| JP | 2010127604 | A | * | 6/2010 | |
| JP | 2018-511773 | A | | 4/2018 | |
| JP | 2018-167565 | A | | 11/2018 | |
| JP | 2018204861 | A | * | 12/2018 | ............ F28D 7/00 |
| JP | 2019-27772 | A | | 2/2019 | |
| JP | 2020-25087 | A | | 2/2020 | |
| JP | 2021-38894 | A | | 3/2021 | |
| WO | WO 2010/098479 | A1 | | 9/2010 | |
| WO | WO 2016/017697 | A1 | | 2/2018 | |

OTHER PUBLICATIONS

Japanese Office Action for Japanese Application No. 2021-027454, dated Jul. 9, 2024, with English translation.
International Preliminary Report on Patentability and Written Opinion of the International Searching Authority for International Application No. PCT/JP2021/006793, dated Sep. 9, 2022, with a English translation.
International Search Report for International Application No. PCT/JP2021/006793, dated Apr. 6, 2021.
Chinese Office Action and Search Report for Chinese Application No. 202180016130.2, dated Mar. 14, 2025, with an English translation.

* cited by examiner

HEAT EXCHANGER CORE, HEAT EXCHANGER, AND METHOD OF PRODUCING HEAT EXCHANGER CORE

TECHNICAL FIELD

The present disclosure relates to a heat exchanger core, a heat exchanger, and a method of producing the heat exchanger core.

The present application claims priority on Japanese Patent Application Nos. 2020-031513 and 2020-031525 filed on Feb. 27, 2020, the entire content of which is incorporated herein by reference.

BACKGROUND

Patent Document 1 discloses a heat exchanger that includes several plates disposed in parallel to each other, and spacers extending between the plates and disposed in parallel to each other so as to define a primary channel and a secondary channel. Patent Document 1 also discloses that the primary channel of the heat exchanger includes a coarse primary channel.

CITATION LIST

Patent Literature

Patent Document 1: JP2018-511773A (translation of a PCT application)

SUMMARY

Technical Problem

However, in the conventional configuration described in Patent Document 1, the plates are brazed to each other by a known method, which does not contribute to shortening a producing time (modeling time) of the heat exchanger (heat exchanger core).

In view of the above, an object of at least one embodiment of the present disclosure is to provide a heat exchanger core, a heat exchanger, and a method of producing the heat exchanger core capable of reducing a production cost by shortening the modeling time.

Solution to Problem

In order to achieve the above object, a heat exchanger core according to the present disclosure includes: a plurality of internal passages; and a header passage communicating with the plurality of internal passages. An inner wall of the header passage has greater surface roughness than passage walls of the plurality of internal passages.

Further, a method of producing a heat exchanger core according to the present disclosure is a method of producing a heat exchanger core that includes a plurality of internal passages extending in parallel to each other, and a header passage communicating with the plurality of internal passages, which includes: a step of forming the internal passages by performing additive manufacturing along an extension direction of the internal passages; and a step of forming the header passage by performing the additive manufacturing along the extension direction. An inner wall of the header passage has greater surface roughness than passage walls of the internal passages.

Advantageous Effects

With the heat exchanger core according to the present disclosure, in the case where the heat exchanger core is modeled by additive manufacturing, a modeling time per unit volume of a portion provided with the header passage can be made shorter than that of a portion provided with the internal passage. Thus, since the molding time of the heat exchanger core can be shortened as a whole, it is possible to reduce a production cost of the heat exchanger core.

Further, with the method of producing the heat exchanger core according to the present disclosure, since the inner wall of the header passage has the greater surface roughness than the passage walls of the internal passages, a modeling time per unit volume in the step of forming the header passage can be made shorter than that of a portion provided with the internal passage. Thus, since the molding time of the heat exchanger core can be shortened as a whole, it is possible to reduce the production cost of the heat exchanger core.

DETAILED DESCRIPTION

Figure 1:
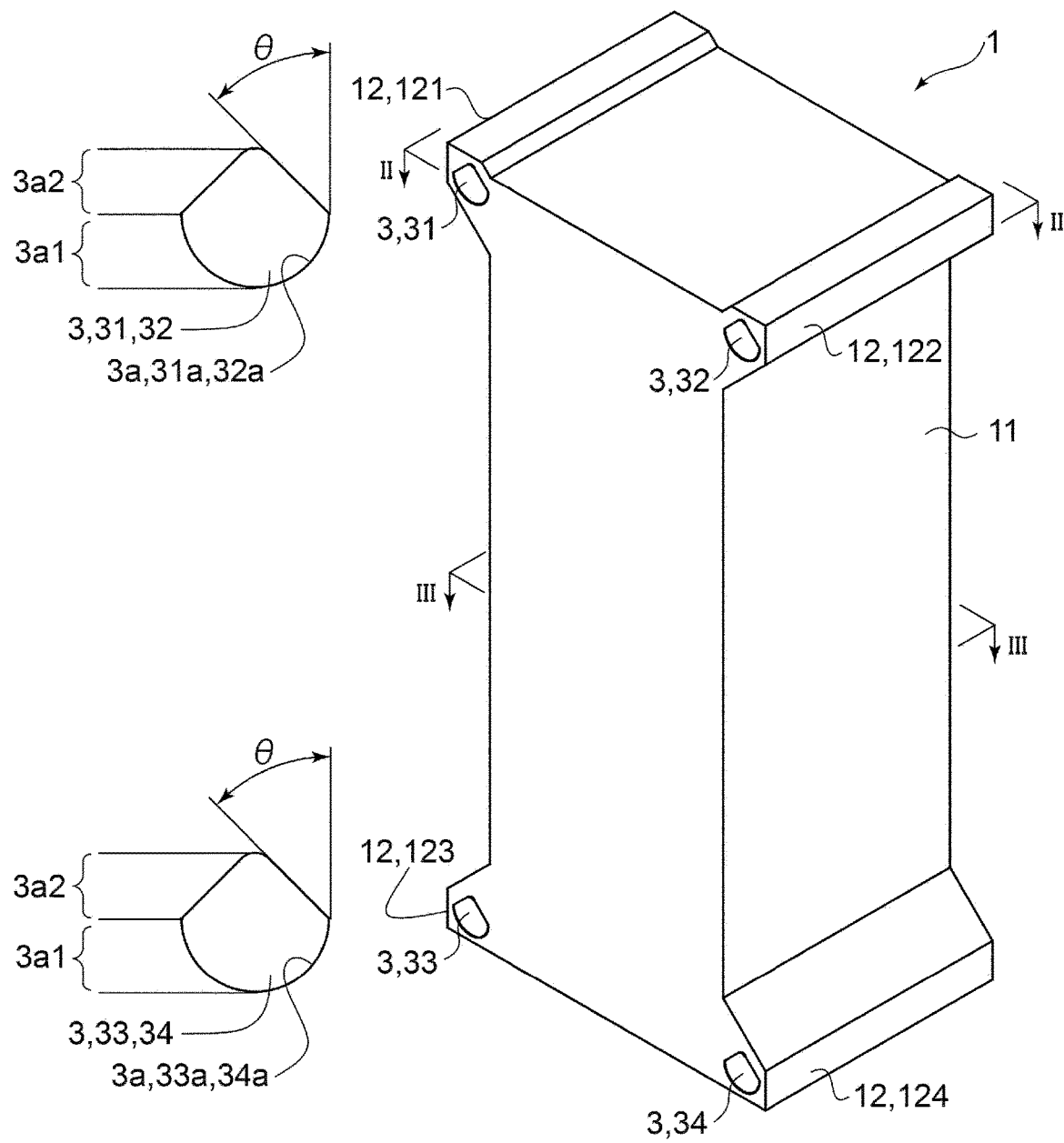
FIG. 1 is a perspective view schematically showing the configuration of a heat exchanger core according to an embodiment.

Hereinafter, a heat exchanger core 1, a heat exchanger 6, and a method of producing the heat exchanger core 1 according to the embodiment of the present disclosure will be described with reference to the accompanying drawings. It is intended, however, that unless particularly specified, dimensions, materials, shapes, relative positions and the like of components described in the embodiment or shown in the drawings shall be interpreted as illustrative only and not intended to limit the scope of the present invention.

[Schematic Configuration of Heat Exchanger Core 1]

The heat exchanger core 1 according to the embodiment of the present disclosure is a component used alone or incorporated in a heat exchanger 6, and heat exchange is performed between a first fluid and a second fluid supplied to the heat exchanger core 1. The first fluid and the second fluid supplied to the heat exchanger core 1 may each be a liquid or a gas, but the temperatures of both are usually different.

As shown in FIG. 1, the heat exchanger core 1 according to the embodiment of the present disclosure includes a body 11 and headers 12. For example, the heat exchanger core 1 can have a rectangular solid shape, but is not limited thereto.

For example, if the heat exchanger core 1 has the rectangular solid shape, the body 11 is disposed in a rectangular solid body portion, and the headers 12 are disposed in pairs at one end (upper end) and another end (lower end) of the rectangular solid, respectively. For example, the headers 12 respectively disposed in pairs at the one end and the another end of the rectangular solid are located at the four corners on the same plane of the rectangular solid.

For example, if the heat exchanger core 1 has the rectangular solid shape, the headers 12 can be disposed outside the rectangular solid, but the present disclosure is not limited thereto. For example, if the headers 12 respectively disposed in pairs at the one end and the another end of the rectangular solid are disposed outside the rectangular solid, they are disposed so as to project outward in a width direction of the rectangular solid. Then, headers 121, 122 disposed at the one end of the rectangular solid serve as the first header 121, the second header 122, respectively, and headers 123, 124 disposed at the another end serve as the third header 123, the fourth header 124, respectively.

The headers 12 are provided with header passages 3. As described above, for example, if the heat exchanger core 1 has the rectangular solid shape and the headers 12 respectively disposed in pairs at the one end and the another end of the rectangular solid are disposed so as to project outward in the width direction of the rectangular solid, the header passages 3 are provided in the headers 12 disposed in pairs at the one end and the another end of the rectangular solid, respectively. Then, a header passage 31 provided in the first header 121 serves as the first header passage 31, and a header passage 32 provided in the second header 122 serves as the second header passage 32. Further, a header passage 33 provided in the third header 123 serves as the third header passage 33, and a header passage 34 provided in the fourth header 124 serves as the fourth header passage 34.

In the heat exchanger core 1 where the first fluid and the second fluid flow in directions opposed to each other (hereinafter, referred to as the "heat exchanger core 1 of opposed flow"), the first header passage 31 serves as a passage for supplying the first fluid to the body 11, and the second header passage 32 serves as a passage for discharging the second fluid from the body 11. Further, the third header passage 33 serves as a passage for discharging the first fluid from the body 11, and the fourth header passage 34 serves as a passage for supplying the second fluid to the body 11. In the heat exchanger core 1 where the first fluid and the second fluid flow in the same direction (hereinafter, referred to as the "heat exchanger core 1 of parallel flow"), the second header passage 32 serves as a passage for supplying the second fluid to the body 11, and the fourth header passage 34 serves as a passage for discharging the second fluid from the body 11.

As described above, there are the plurality of header passages 3, and although not explicitly illustrated in the figures, the plurality of header passages 3 can have different passage opening shapes. For example, as described above, the header passages 3 of the heat exchanger core 1 are four passages, namely, the first header passage 31, the second header passage 32, the third header passage 33, and the fourth header passage 34, and these four header passages, that is, the first header passage 31, the second header passage 32, the third header passage 33, and the fourth header passage 34 can have the different passage opening shapes.

If there are the plurality of header passages 3 and the opening shapes of the plurality of header passages 3 are different from each other as described above, it is possible to more reliably prevent a connection error thanks to the difference in the passage opening shapes when a pipe is connected to the heat exchanger core 1.

Figure 2:
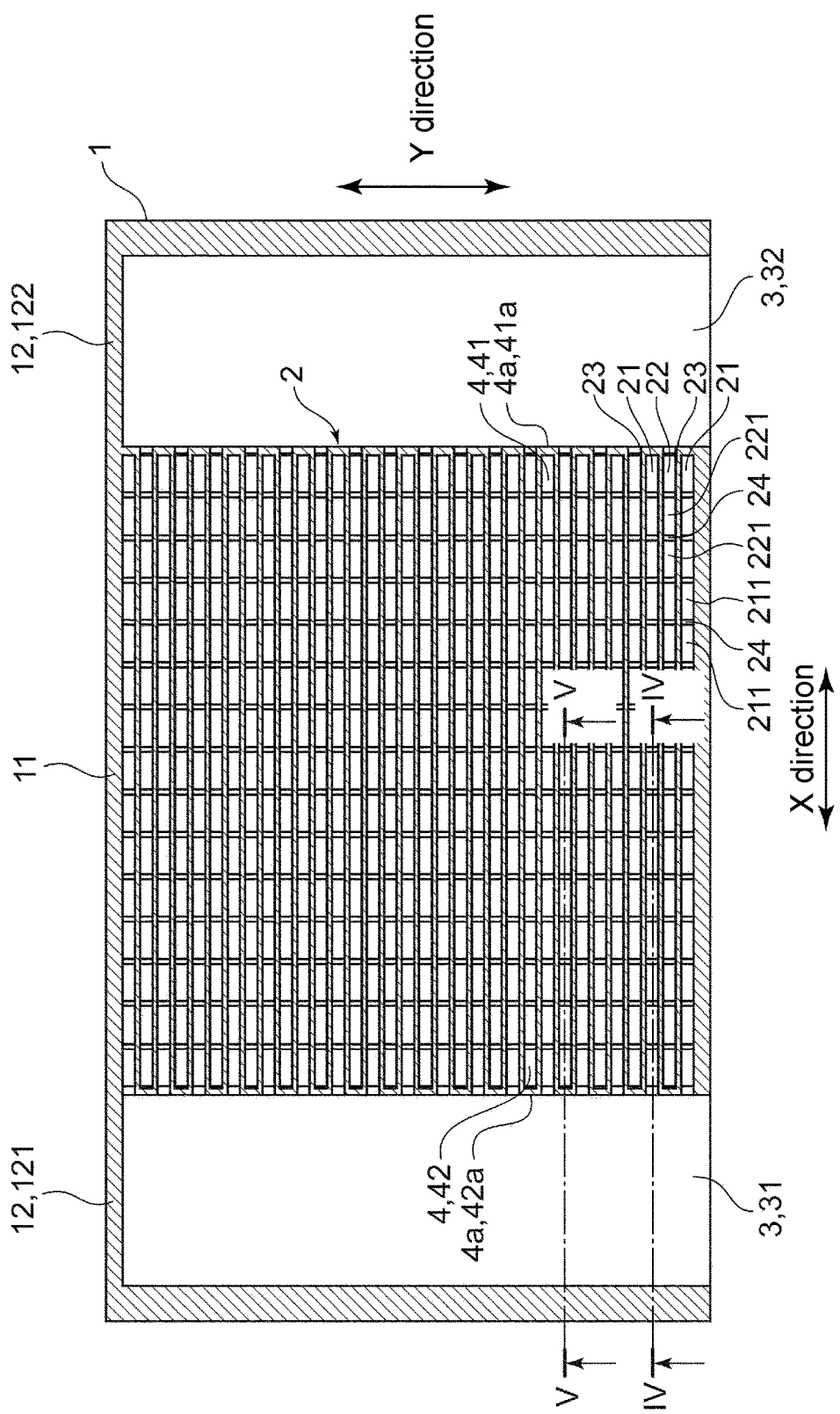
FIG. 2 is a cross-sectional view of the heat exchanger core shown in FIG. 1, taken along line II-II.

As shown in FIG. 2, the heat exchanger core 1 according to the embodiment of the present disclosure includes a plurality of internal passages 2 in the body 11. The plurality of internal passages 2 are passages extending in parallel to each other, and the plurality of internal passages 2 communicate with the above-described header passages 3 at ends of the plurality of internal passages 2 in an extension direction of the plurality of internal passages 2. For example, if the heat exchanger core 1 has the rectangular solid shape, the plurality of internal passages 2 are disposed along the longitudinal direction of the rectangular solid, and the above-described header passages 3 are disposed along a direction orthogonal to the longitudinal direction of the rectangular solid. The plurality of internal passages 2 communicate with the above-described header passages 3 at one end and another end of each of the plurality of internal passages 2.

Figure 3:
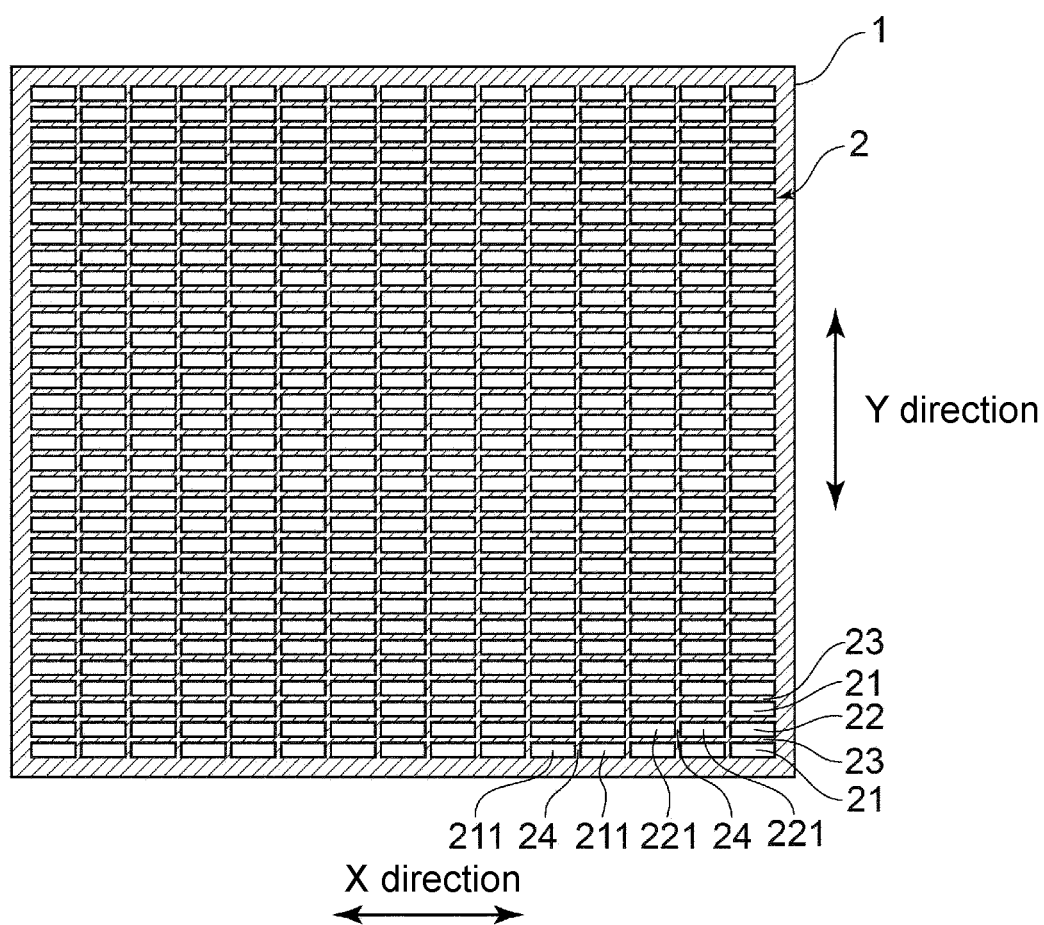
FIG. 3 is a cross-sectional view of the heat exchanger core shown in FIG. 1, taken along line III-III.

As shown in FIG. 3, the plurality of internal passages 2 constitute the plurality of first passages 21 through which the first fluid flows and the plurality of second passages 22 through which the second fluid flows. The plurality of first passages 21 and the plurality of second passages 22 are alternately disposed in a depth direction (Y direction in FIG. 3) in a cross section orthogonal to the longitudinal direction of the rectangular solid, and the first passage 21 and the second passage 22 adjacent to each other are separated by a partition wall 23. The number of plurality of first passages 21 and plurality of second passages 22, that is, the number of partition walls 23 is not limited to the number shown in FIG. 3, but can be any number.

For example, the plurality of first passages 21 and the plurality of second passages 22 are divided into a plurality of divided passages 211 and 221, respectively, but the present disclosure is not limited thereto. If the plurality of first passages 21 and the plurality of second passages 22 are divided into the plurality of divided passages 211 and 221, respectively, the respective plurality of divided passages 211 and 221 of the plurality of first passages 21 and the plurality of second passages 22 are disposed along the width direction (X direction in FIG. 3) in the cross section orthogonal to the rectangular solid, and the divided passage 211 (221) and the divided passage 211 (221) adjacent to each other are separated by a dividing wall 24. The number of divided passages 211, 221 respectively provided in the plurality of first passages 21 and the plurality of second passages 22, that is, the number of dividing walls 24 respectively provided in the plurality of first passages 21 and the plurality of second passages 22 is not limited to the number shown in FIG. 3, but can be any number.

Figure 4:
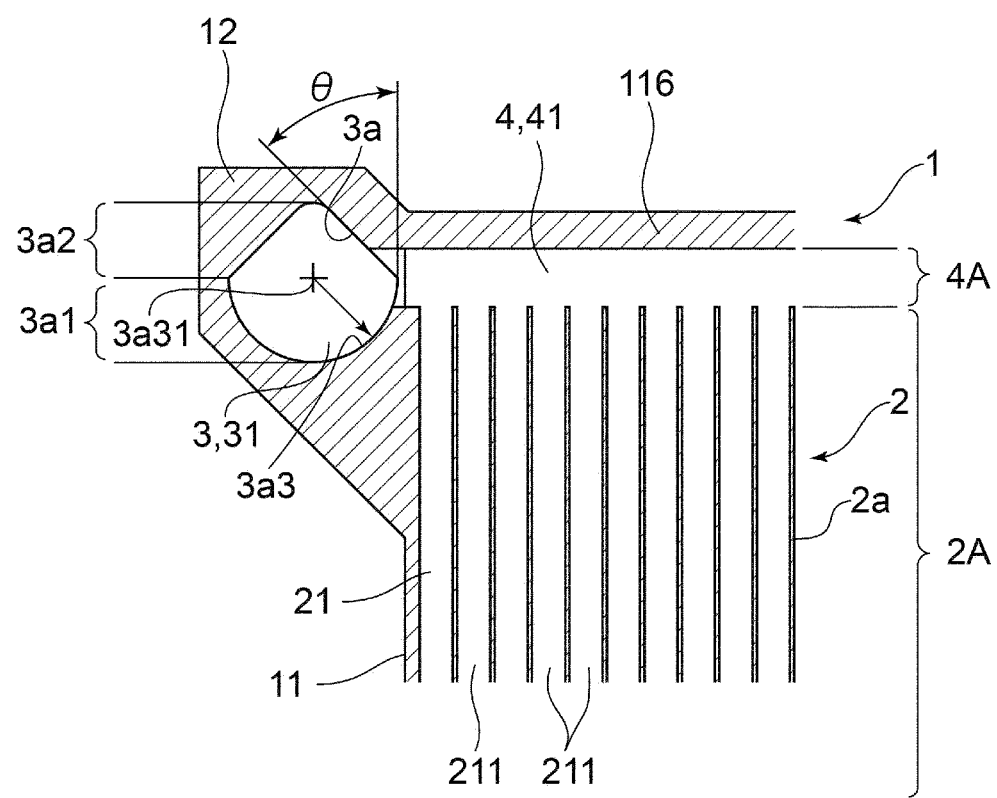
FIG. 4 is a cross-sectional view of the heat exchanger core shown in FIG. 2, taken along line IV-IV.

As will be described later, FIG. 4 is a view of an intermediate passage 41 through which the first header passage 31 and the first passage 21 communicate with each other. As will be described later, FIG. 5 is a view of an intermediate passage 42 through which the first header passage 31 and the second passage 22 do not communicate with each other.

Figure 5:
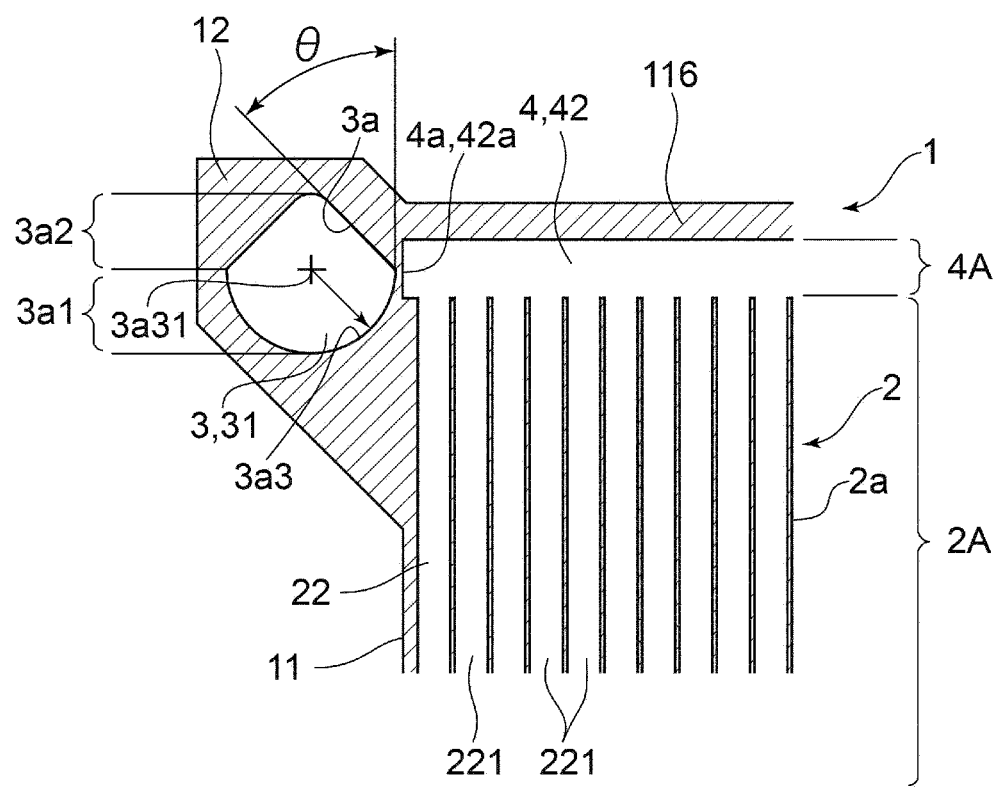
FIG. 5 is a cross-sectional view of the heat exchanger core shown in FIG. 2, taken along line V-V.

As shown in FIGS. 4 and 5, if the plurality of first passages 21 and the plurality of second passages 22 are divided into the plurality of divided passages 211 and 221, respectively, the plurality of first passages 21 and the plurality of second passages 22 each include, at one end and another end thereof, the intermediate passages 4.

As shown in FIG. 4, the intermediate passage 41 (hereinafter, referred to as the "first intermediate passage 41") disposed at the one end (upper end) of the first passage 21 communicates with the plurality of divided passages 211, which are divided in the first passage 21, at one end (upper end) of each of the plurality of divided passages 211 in an extension direction of the plurality of divided passages 211 (an extension direction of the first passage 21). The first intermediate passage 41 opens at the one end (upper end) of the first passage 21, while being separated from the outside by an outer wall (top wall) 116. As shown in FIG. 5, the intermediate passage 42 (hereinafter, referred to as the "second intermediate passage 42") disposed at the one end (upper end) of the second passage 22 communicates with the plurality of divided passages 221, which are divided in the second passage 22, at one end (upper end) of each of the plurality of divided passages 221 in an extension direction of the plurality of divided passages 221 (an extension direction of the second passage 22). The second intermediate passage 42 opens at the one end (upper end) of the second passage 22, while being separated from the outside by the outer wall (top wall) 116. Although not shown, the intermediate passage (hereinafter, referred to as the "third intermediate passage") disposed at the another end (lower end) of the first passage 21 communicates with the plurality of divided passages 211, which are divided in the first passage 21, at another end (lower end) of each of the plurality of divided passages 211 in the extension direction of the plurality of divided passages 211 (the extension direction of the first passage 21). The third intermediate passage opens at the another end (lower end) of the first passage 21, while being separated from the outside by an outer wall (bottom wall) 111. The intermediate passage (hereinafter, referred to as the "fourth intermediate passage") disposed at the another end (lower end) of the second passage 22 communicates with the plurality of divided passages 221, which are divided in the second passage 22, at another end (lower end) of each of the plurality of divided passages 221 in an extension direction of the plurality of divided passages 221 (an extension direction of the second passage 22). The fourth intermediate passage opens at the another end (lower end) of the second passage 22, while being separated from the outside by the outer wall (bottom wall) 111.

As shown in FIG. 4, the first header passage 31 extends in a direction orthogonal to the extension direction of the first passage 21 and communicates with the first passage 21 via the first intermediate passage 41, at the one end (upper end) of the first passage 21 in the extension direction of the first passage 21. As shown in FIG. 5, the second header passage 32 extends in a direction orthogonal to the extension direction of the second passage 22 and communicates with the second passage 22 via the second intermediate passage 42, at the one end (upper end) of the second passage 22 in the extension direction of the second passage 22. Although not shown, the third header passage 33 extends in the direction orthogonal to the extension direction of the first passage 21 and communicates with the first passage 21 via the third intermediate passage, at the another end (lower end) of the first passage 21 in the extension direction of the first passage 21. The fourth header passage 34 extends in the direction orthogonal to the extension direction of the second passage 22 and communicates with the second passage 22 via the fourth intermediate passage, at the another end (lower end) of the second passage 22 in the extension direction of the second passage 22.

As shown in FIG. 2, a partition wall 4*a* is disposed between the header passage 3 and the intermediate passage 4 through which the other fluid flows. The partition wall 4*a* separates different kinds of fluids. For example, a partition wall 42*a* for separating the second fluid is disposed between the first header passage 31 and the second intermediate passage 42, and a partition wall 41*a* for separating the first fluid is disposed between the second header passage 32 and the first intermediate passage 41. Further, although not shown, for example, a partition wall for separating the second fluid is disposed between the third header passage 33 and the fourth intermediate passage, and a partition wall for separating the first fluid is disposed between the fourth header passage 34 and the third intermediate passage. The partition wall 4*a* between the header passage 3 and the intermediate passage 4 through which the other fluid flows is along the extension direction of the internal passages 2 (see FIG. 5). For example, the partition wall 42*a* between the first header passage 31 and the second intermediate passage 42 through which the second fluid flows is along the extension direction of the second passage 22. Further, for example, the partition wall 41*a* between the second header passage 32 and the first intermediate passage 41 through which the first fluid flows is along the extension direction of the first passage 21. Further, although not shown, for example, the partition wall between the third header passage 33 and the fourth intermediate passage through which the second fluid flows is along the extension direction of the second passage 22. Further, for example, the partition wall between the fourth header passage 34 and the first passage 21 through which the first fluid flows is along the extension direction of the first passage 21.

As shown in FIG. 5, with such heat exchanger core 1 including the partition wall 4*a* along the extension direction of the internal passages 2, the partition wall 4*a* for separating the different fluids does not have an overhang shape, and thus the partition wall can be thinned. Consequently, the header passage 3 can be moved inward toward an arrangement region of the internal passages, and it is possible to downsize the heat exchanger core 1.

For example, in the example shown in FIG. 5, the partition wall 4*a* between the header passage 3 and the intermediate passage 4 is thinned to bring the intermediate passage 4 closer to the header passage 3. Further, although an intermediate passage side of the partition wall 4*a* has a rectangular cross section as viewed from a direction orthogonal to the intermediate passage 4, an inclined surface of, for example, 45 degrees may be provided which is inclined toward the intermediate passage side.

[Inner Wall 3*a* of Header Passage 3]

An inner wall 3*a* of the header passage 3 has greater surface roughness than a passage wall 2*a* of the internal passage 2. For example, if the first header passage 31, the second header passage 32, the third header passage 33, and the fourth header passage 34 are disposed outside the rectangular solid, inner walls 31*a*, 32*a*, 33*a*, 34*a* of the first header passage 31, the second header passage 32, the third header passage 33, and the fourth header passage 34 have greater surface roughness than passage walls 21*a*, 22*a* of the first passage 21 and the second passage 22.

For example, the Japan industry standards (JIS) specifies, as parameters representing surface roughness, definitions and displays of arithmetic average roughness (Ra), maximum height (Ry), ten-point average roughness (Rz), average interval of unevenness (Sm), average interval(S) of local peaks, and load length ratio (tp), and surface roughness is arithmetic mean of respective portions randomly extracted from the surface of an object.

With the heat exchanger core 1 having the inner wall 3*a* of the header passage 3, since the inner wall 3*a* of the header passage 3 has the greater surface roughness than the passage wall 2*a* of the internal passage 2, in the case where the heat exchanger core 1 is modeled by additive manufacturing, a modeling time per unit volume of a portion provided with the header passage 3 can be made shorter than that of a portion provided with the internal passage 2. Thus, since the molding time of the heat exchanger core 1 can also be shortened as a whole, it is possible to reduce the production cost of the heat exchanger core 1.

The plurality of internal passages 2 extend in parallel to each other, and the inner wall 3*a* of the header passage 3 includes a first region 3*a*1 and a second region 3*a*2. The first region 3*a*1 is a non-overhang region located on one side in the extension direction of the plurality of internal passages 2, and has first surface roughness. The second region 3*a*2 is an overhang region located on another side of the plurality of internal passages 2, and has second surface roughness which is not less than the first surface roughness. The first surface roughness of the inner wall 3*a* of the header passage 3 is greater than surface roughness of the passage walls 2*a* of the plurality of internal passages 2.

With such heat exchanger core 1 which has the inner wall 3*a* of the header passage 3 including the first region 3*a*1 and the second region 3*a*2, the second surface roughness of the second region (overhang region) 3*a*2 of the header passage 3 is not less than the first surface roughness of the first region (non-overhang region) 3*a*1, and the first region (non-overhang region) 3*a*1 of the header passage 3 is greater than the surface roughness of the passage walls 2*a* of the plurality of internal passages 2.

Thus,
the second surface roughness of the second region 3*a*2≥the first surface roughness of the first region 3*a*1>the surface roughness of the passage walls of the plurality of internal passages 2
is obtained.

That is, the first surface roughness of the first region (non-overhang region) 3*a*1 is equal to or less than the second surface roughness of the second region (overhang region) 3*a*2, and the modeling time per unit area of the portion provided with the first region 3*a*1 can be made shorter than that of the portion provided with the plurality of internal passages 2. Thus, since the molding time of the heat exchanger core 1 can also be shortened as a whole, it is possible to reduce the production cost of the heat exchanger core 1.

As shown in FIGS. 4 and 5, the second region 3*a*2 has an inclined surface whose angle θ with respect to the extension direction of the plurality of internal passages 2 is not greater than 60 degrees, preferably not greater than 45 degrees.

As shown in FIG. 1, the inner walls 31*a*, 32*a*, 33*a*, 34*a* of the first header passage 31, the second header passage 32, the third header passage 33, and the fourth header passage 34 include a lower half portion serving as the first region 3*a*1 and an upper half portion serving as the second region 3*a*2. The lower half portion is located on one side (lower side) in the extension direction of the first passage 21, and the upper half portion is located on another side (upper side) in the extension direction of the first passage 21. The upper half portion has an inclined surface whose angle θ with respect to the extension direction of the first passage 21 is not greater than 60 degrees, preferably not greater than 45 degrees.

For example, the lower half portion is formed into a curved groove type whose cross section is formed into an arc shape, but the present disclosure is not limited thereto. For example, the lower half portion may be formed into a groove type having a rectangular cross section, a groove type having an inverted triangular cross section, or the like. Thus, it is possible to suppress the thickness of the first region 3*a*1 while ensuring a passage cross-sectional area larger than that of the groove type having the rectangular cross section, the groove type having the inverted triangular cross section, or the like. Further, the upper half portion is formed in a roof shape whose cross section is formed into an isosceles triangular shape, but the present disclosure is not limited thereto.

With such heat exchanger core 1 having the inner wall 3*a* of the header passage 3, since the angle of the inclined surface forming the second region 3*a*2 of the header passage 3 with respect to the extension direction of the plurality of internal passages 2 is 60 degrees, preferably not greater than 45 degrees, in the case where the heat exchanger core 1 is modeled by additive manufacturing, if the extension direction of the internal passages 2 is a lamination direction with priority given to the internal passages 2 over the header passage 3, it is possible to perform additive manufacturing on the heat exchanger core 1 including the header passage 3 as well while avoiding a problem of, for example, occurrence of a modeling failure due to a loss of an overhang shape, or occurrence of warpage in the modeled product due to a residual stress caused during modeling and resultant deterioration in accuracy (hereinafter, referred to as "overhang problem"). Further, the top and bottom of the heat exchanger core 1 can be determined based on where the second region 3*a*2 of the header passage 3 is located, making it possible to reduce the possibility of mistakenly installing the top and bottom of the heat exchanger core 1.

[Arrangement of Header Passage 3]

As shown in FIG. 4, the header passage 3 is at least partially arranged within a formation range 2A of the plurality of internal passages 2 in the extension direction of the plurality of internal passages 2. For example, the first header passage 31 is at least partially arranged within the formation range 2A of the first passage 21 in the extension direction of the first passage 21. Thus, the first header passage 31 overlaps the first passage 21 in the extension direction of the first passage 21. Although not shown, for example, the second header passage 32 is at least partially arranged within a formation range of the second passage 22 in the extension direction of the second passage 22. Thus, the second header passage 32 overlaps the second passage 22 in the extension direction of the second passage 22. For example, the third header passage 33 is at least partially arranged within the formation range of the first passage 21 in the extension direction of the first passage 21. Thus, the third header passage 33 overlaps the first passage 21 in the extension direction of the first passage 21. For example, the fourth header passage 34 is at least partially arranged within the formation range of the second passage 22 in the extension direction of the second passage 22. Thus, the fourth header passage 34 overlaps the second passage 22 in the extension direction of the second passage 22.

With the heat exchanger core 1 in which the header passage 3 is thus arranged, since the header passage 3 is arranged within the formation range 2A in the extension direction of the plurality of internal passages 2, it is possible to suppress the dimension of the heat exchanger core 1 in the extension direction of the plurality of internal passages 2 to downsize the heat exchanger core 1. Since the header passage 3 is formed within the formation range 2A of the plurality of internal passages 2, the overhang of the header passage 3 causes the problem. However, the overhang problem can be solved by the inclined surface of the second region 3*a*2 of the inner wall 3*a* of the header passage 3 described above. Thus, it is possible to efficiently produce the compact heat exchanger core 1 by additive manufacturing, while avoiding the overhang problem.

[Curved Surface 3$a$3 of Inner Wall 3$a$ of Header Passage 3]

As shown in FIGS. 4 and 5, the heat exchanger core 1 includes an intermediate passage 4 adjacent to the ends of the internal passages 2. The inner wall 3$a$ of the header passage 3 includes a curved surface 3$a$3 having an arc shape, and the partition wall 4$a$ includes a part of the curved surface 3$a$3 on its surface. A curvature center 3$a$31 of the curved surface 3$a$3 is located within a formation range 4A of the intermediate passage 4 in the extension direction of the internal passages 2.

With such heat exchanger core 1 which includes the header passage 3 having the inner wall with the curved surface, on the inner wall 3$a$ of the header passage 3 having the arc-shaped curved surface 3$a$3, it is possible to set a tangent direction of the arc shape along the extension direction of the internal passages 2, and the partition wall 4$a$ can be thinned by the simple header passage shape.

[Plurality of Header Passages 3]

As shown in FIG. 1, the heat exchanger core 1 includes a pair of header passages 3 located on both end sides of the plurality of internal passages 2. A pair of second regions 3$a$2 are disposed on the same side with respect to the first region 3$a$1. For example, the heat exchanger core 1 includes a pair of header passages 3, the first header passage 31 and the third header passage 33, located on both end sides of the first passage 21. The second regions 3$a$2 of the first header passage 31 and the second region 3$a$2 of the third header passage 33 are disposed on the same side with respect to the first region 3$a$1. For example, the first header passage 31 and the third header passage 33 each include the first region 3$a$1 on the lower side in the gravity direction, and include the second region 3$a$2 on the upper side. Further, for example, the heat exchanger core 1 includes a pair of header passages 3, the second header passage 32 and the fourth header passage 34, located on both end sides of the second passage 22. The second regions 3$a$2 of the second header passage 32 and the second region 3$a$2 of the fourth header passage 34 are disposed on the same side with respect to the first region 3$a$1. For example, the second header passage 32 and the fourth header passage 34 each include the first region 3$a$1 on the lower side in the gravity direction, and include the second region 3$a$2 on the upper side.

With such heat exchanger core 1 including the plurality of header passages 3, since the second regions 3$a$2 of the pair of header passages 3 are disposed on the same side with respect to the first region 3$a$1, even if the extension direction of the internal passages 2 is the lamination direction with priority given to the internal passages 2 over the header passages 3, it is possible to perform additive manufacturing on the heat exchanger core 1 including the pair of header passages 3 as well while avoiding the overhang problem. Further, the top and bottom of the heat exchanger core 1 can be determined based on where the second region 3$a$2 of the header passage 3 is located, making it possible to reduce the possibility of mistakenly installing the top and bottom of the heat exchanger core 1.

[Body Side Surface of Heat Exchanger Core 1]

As shown in FIG. 2, at least a part of the header passage 3 is located in a header region which is dislocated to the outside from the arrangement region of the plurality of internal passages 2 in a planar view seen from the extension direction of the plurality of internal passages 2. The body 11 has a body side surface extending along the internal passages 2 in a section closer to the arrangement region of the internal passages 2 than a portion of the header region most dislocated outward from the arrangement region of the internal passages 2 in the planar view (see FIGS. 4 and 5).

With such heat exchanger core 1 having the body side surface, since the body side surface has the body side surface extending along the extension direction of the internal passages 2 in the section closer to the arrangement region than the portion of the header region farthest away from the arrangement region to the outside in the planar view, it is possible to reduce the thickness of the outer wall (side wall) including the body side surface, and it is possible to shorten a time required for modeling the outer wall including the body side surface.

Thus, it is also possible to reduce the production cost of the heat exchanger core 1.

[Outer Wall (Top Wall) 116 of Heat Exchanger Core 1]

As shown in FIGS. 4 and 5, the heat exchanger core 1 includes the intermediate passage 4 for causing the plurality of internal passages 2 to communicate with the header passage 3. The intermediate passage 4 opens to the plurality of internal passages 2, while being separated from the outside by the outer wall (top wall) 116. The outer wall (top wall) 116 separating the intermediate passage 4 from the outside is recessed toward the internal passages 2 side along the extension direction of the intermediate passage 4 with respect to the header 12.

With such heat exchanger core 1 including the outer wall (top wall) 116, since the outer wall (top wall) 116 separating the intermediate passage 4 from the outside is recessed toward the internal passages 2 side, it is possible to reduce the weight of the outer wall (top wall) 116 as compared with a case where the outer wall (top wall) 116 is not recessed toward the internal passages 2 side.

[Positional Relationship Among Internal Passage 2, Intermediate Passage 4, and Header Passage 3]

As shown in FIG. 4, the header passage 3 is at least partially located opposite to the internal passages 2 across the intermediate passage 4 in the extension direction of the internal passages 2.

With such heat exchanger core 1 having the positional relationship among the internal passages 2, the intermediate passage 4, and the header passage 3, it is possible to suppress the thickness of the outer wall separating the intermediate passage 4 from the outside, while sufficiently securing the cross-sectional area of the header passage 3. Since the modeling volume is reduced by thus suppressing the thickness, the modeling time is shortened accordingly, making it possible to reduce the amount of metal used. Thus, it is also possible to reduce the production cost of the heat exchanger core 1.

[Additional Configuration of Heat Exchanger Core 1]

Figure 6:
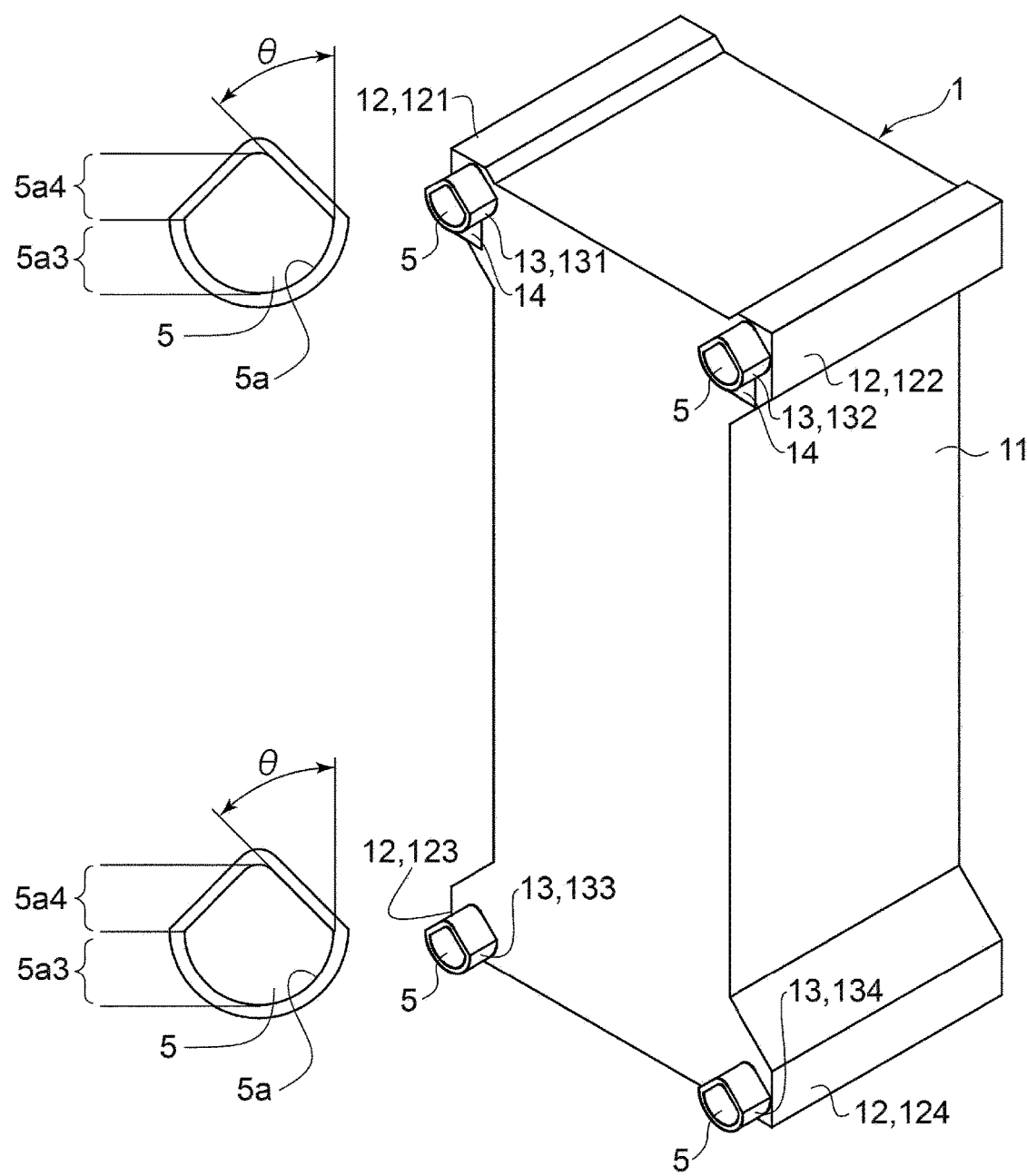
FIG. 6 is a perspective view schematically showing the configuration of the heat exchanger core according to an embodiment.

As shown in FIG. 6, the heat exchanger core 1 may include a connection pipe 13 projecting from the header 12 in the extension direction of the header passage 3. The connection pipe 13 includes a connection passage 5 communicating with the header passage 3. The heat exchanger core 1 thus including the connection pipe 13 can easily be connected to a fluid supply pipe (fluid supply path) connected to a fluid supply source or a fluid discharge pipe (fluid discharge path) connected to a fluid discharge destination.

As shown in FIG. 6, an inner wall 5$a$ of the connection passage 5 includes a third region 5$a$3 and a fourth region 5$a$4. The third region 5$a$3 is a non-overhang region connected to the first region 3$a$1 of the header passage 3 and located on one side in the extension direction of the plurality of internal passages 2. The fourth region 5$a$4 is an overhang region connected to the second region 3$a$2 of the header passage 3 and located on another side in the extension direction of the plurality of internal passages 2. As with the second region 3a2 of the header passage 3, the fourth region 5a4 has an inclined surface whose angle with respect to the extension direction of the plurality of internal passages 2 is not greater than 60 degrees, preferably not greater than 45 degrees.

For example, the thickness of the connection pipe 13 is constant, the cross section of the lower half portion has the arc shape, and the cross section of the upper half portion has a mountain shape. However, the present disclosure is not limited thereto, and the outer circumference of the connection pipe 13 may have a circular cross section.

Further, the connection pipe 13 may include a support 14 for supporting the connection pipe 13 from the header 12. Such connection pipe 13 including the support 14 for supporting the connection pipe 13 from the header 12 can be produced together with the body of the heat exchanger core 1 by additive manufacturing.

With such heat exchanger core 1 including the inner wall 5a of the connection passage 5, since the angle of the inclined surface forming the fourth region 5a4 of the connection passage 5 with respect to the extension direction of the plurality of internal passages 2 is 60 degrees, preferably not greater than 45 degrees, in the case where connection pipe 13 is modeled together with the heat exchanger core 1 by additive manufacturing, it is possible to perform additive manufacturing while avoiding the overhang problem. Further, the top and bottom of the heat exchanger core 1 can be determined based on where the fourth region 5a4 of the connection pipe 13 is located, making it possible to reduce the possibility of mistakenly installing the top and bottom of the heat exchanger core 1.

[Plurality of Connection Pipes 13]

As shown in FIG. 6, the heat exchanger core 1 includes a pair of connection pipes 13 located on the both end sides of the plurality of internal passages 2. A pair of fourth regions 5a4 are disposed on the same side with respect to the third region 5a3. For example, the heat exchanger core 1 includes a pair of connection pipes 13, a first connection pipe 131 and a third connection pipe 133, located on the both end sides of the first passage 21. The fourth regions 5a4 of the first connection pipe 131 and the fourth region 5a4 of the third connection pipe 133 are disposed on the same side with respect to the third region 5a3. For example, the first connection pipe 131 and the third connection pipe 133 each include the third region 5a3 on the lower side in the gravity direction, and include the fourth region 5a4 on the upper side. Further, for example, the heat exchanger core 1 includes a pair of connection pipes 13, a second connection pipe 132 and a fourth connection pipe 134, located on the both end sides of the second passage 22. The fourth regions 5a4 of the second connection pipe 132 and the fourth region 5a4 of the fourth connection pipe 134 are disposed on the same side with respect to the third region 5a3. For example, the second connection pipe 132 and the fourth connection pipe 134 each include the third region 5a3 on the lower side in the gravity direction, and include the fourth region 5a4 on the upper side.

With such heat exchanger core 1 including the plurality of connection pipes 13, since the fourth regions 5a4 of the pair of connection pipes 13 are disposed on the same side with respect to the third region 5a3, even if the extension direction of the internal passages 2 is the lamination direction with priority given to the internal passages 2 over the connection pipes 13, it is possible to perform additive manufacturing on the heat exchanger core 1 including the pair of connection pipes 13 as well while avoiding the overhang problem. Further, the top and bottom of the heat exchanger core 1 can be determined based on where the fourth region 5a4 of the connection pipe 13 is located, making it possible to reduce the possibility of mistakenly installing the top and bottom of the heat exchanger core 1.

[Adapter 15 of Heat Exchanger Core 1]

Figure 7:
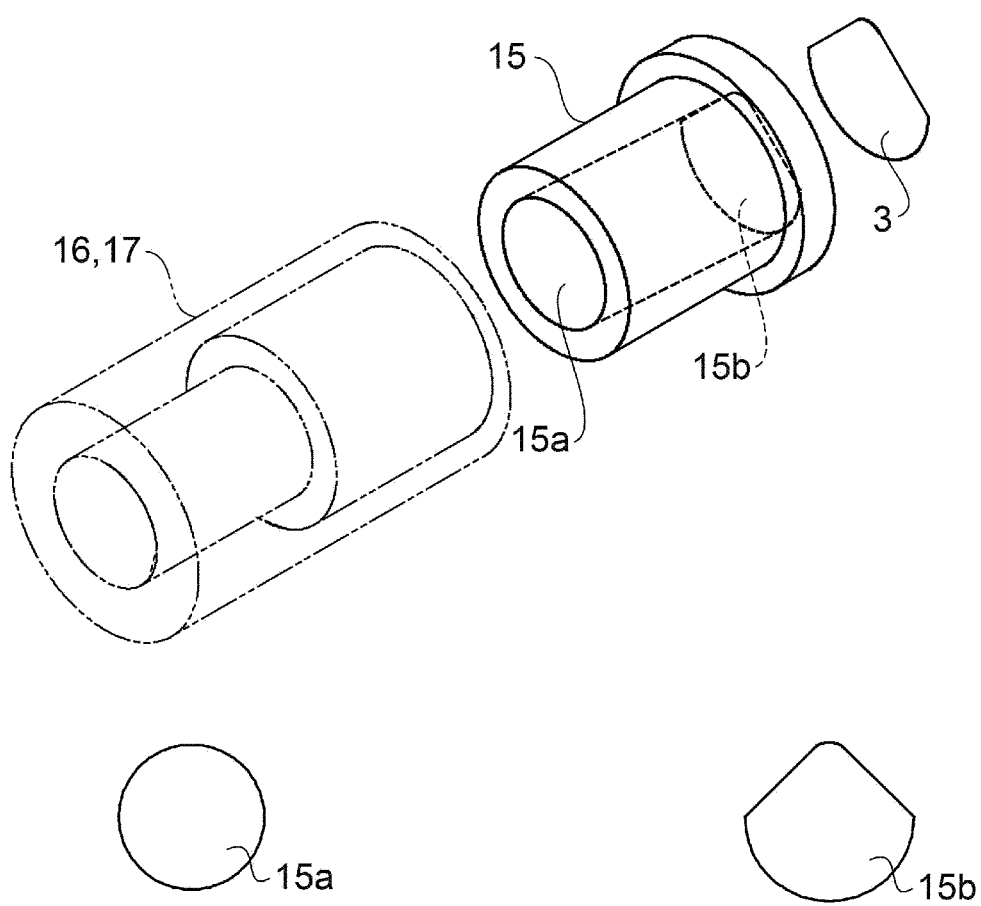
FIG. 7 is a perspective view schematically showing an adapter for converting a passage cross-sectional shape.

As shown in FIG. 7, the heat exchanger core 1 may include an adapter 15 in the header 12. The adapter 15 converts the passage cross-sectional shape between the header 12 and a fluid supply pipe 16 or a fluid discharge pipe 17, and is joined to, for example, the header 12 of the heat exchanger core 1. The adapter 15 has a same passage cross-sectional shape 15a as the fluid supply pipe 16 or the fluid discharge pipe 17 on the fluid supply pipe 16 or the fluid discharge pipe 17 side, and has a same passage cross-sectional shape 15b as the header passage 3 on the header 12 side. The fluid supply pipe 16 or the fluid discharge pipe 17 side of the adapter 15 and the header 12 side are in communication with each other, and the passage cross-sectional shape changes while maintaining the passage cross-sectional area from the fluid supply pipe 16 or the fluid discharge pipe 17 side toward the header 12 side.

With such heat exchanger core 1 including the adapter 15, even if the passage cross-sectional shape of the fluid supply pipe 16 or the fluid discharge pipe 17 is different from the passage cross-sectional shape of the header passage 3, it is possible to connect the fluid supply pipe 16 or the fluid discharge pipe 17 to the header 12. Then, since the passage cross-sectional shape changes while maintaining the passage cross-sectional area from the fluid supply pipe 16 or the fluid discharge pipe 17 side toward the header 12, it is possible to suppress a pressure loss of the fluid flowing from the fluid supply pipe 16 to the header passage 3 or the fluid flowing from the header passage 3 to the passage discharge pipe.

[Heat Exchanger 6]

Figure 8:
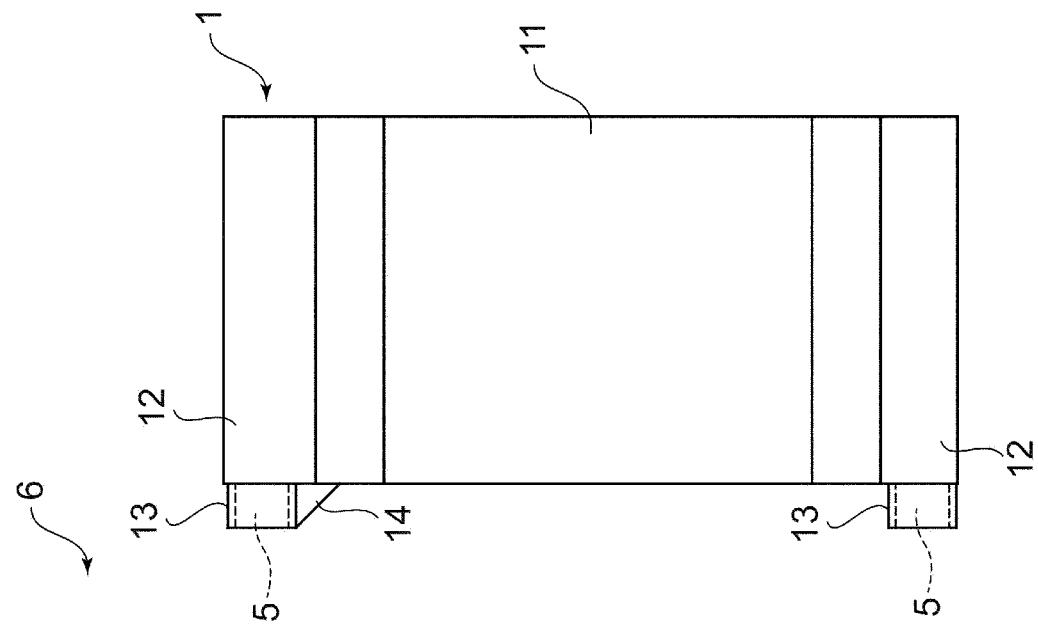
FIG. 8 is a view for describing the heat exchanger according to an embodiment.
Figure 8:
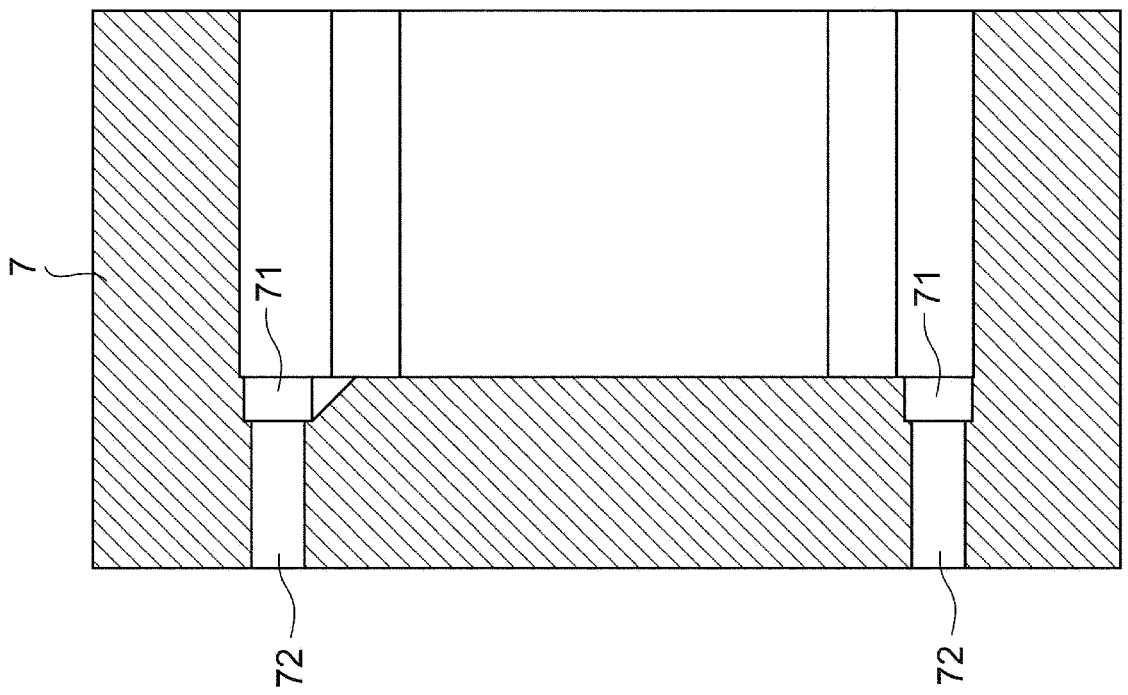

As shown in FIG. 8, the heat exchanger 6 according to the embodiment of the present disclosure includes the above-described heat exchanger core 1 and a housing 7 in which the heat exchanger core 1 is housed. The housing 7 includes a fitting recess 71 into which the connection pipe 13 is fitted when the heat exchanger core 1 is housed, and a passage 72 with which the connection passage 5 communicates when the connection pipe 13 is fitted into the fitting recess 71. If the connection pipe 13 includes the support 14, the housing 7 includes the support 14 when the heat exchanger core 1 is housed, and the connection pipe 13 is fitted into the fitting recess 71.

With such heat exchanger 6, since the heat exchanger core 1 is housed in the housing 7 and the connection passage 5 communicates with the passage 72 by fitting the connection pipe 13 into the fitting recess 71, it is possible to connect the connection passage 5 to the passage 72 by housing the heat exchanger core 1 in the housing 7. Further, since the connection pipe 13 is fitted into the fitting recess 71, play between the connection pipe 13 and the fitting recess 71 is small, requiring no fine adjustment or the like.

Further, although not particularly shown, if one heat exchanger 6 is configured by providing a plurality of housing recesses in the housing 7 and housing the plurality of heat exchanger cores 1 in the housing 7, it is possible to increase the amount of heat exchanged by the heat exchanger 6 (scale-up is possible).

Further, for example, if the thickness of the connection pipe 13 is constant, the cross section of the lower half portion has the arc shape, and the cross section of the upper half portion has the mountain shape, the connection pipe 13 is stuck in and is not fitted into the fitting recess 71 if the top and bottom of the heat exchanger core 1 are mistaken. Thus, it is possible to prevent the top and bottom of the heat exchanger core 1 from being left mistaken.

Further, although not shown, if the above-described heat exchanger core 1 includes the adapter 15, the adapter 15 may be fitted into the fitting recess 71 when the heat exchanger core 1 is housed in the housing 7. Thus, since the heat exchanger core 1 is housed in the housing 7 and the header passage 3 communicates with the passage 72 by fitting the adapter 15 into the fitting recess 71, it is possible to connect the header passage 3 to the passage 72 by housing the heat exchanger core 1 in the housing 7. In the present example, the fitting recess 71 can have a sealing function between the fitting recess 71 and the adapter 15.

[Method of Producing Heat Exchanger Core 1]

The method of producing the heat exchanger core 1 according to the embodiment of the present disclosure is a method of producing the heat exchanger core 1 that includes the plurality of internal passages 2 extending in parallel to each other, and the header passage 3 communicating with the plurality of internal passages 2. The method of producing the heat exchanger core 1 includes a step of forming the internal passages 2 by performing additive manufacturing along the extension direction of the internal passages 2, and a step of forming the header passage 3 by performing additive manufacturing along the extension direction of the internal passages 2. In the method of producing the heat exchanger core 1, the inner wall 3a of the header passage 3 has the greater surface roughness than the passage wall 2a of the internal passage 2.

With such method of producing the heat exchanger core 1, since the inner wall 3a of the header passage 3 has the greater surface roughness than the passage wall 2a of the internal passage 2, a modeling time per unit volume in the step of forming the header passage 3 can be made shorter than that of the portion provided with the internal passage 2. Thus, since the molding time of the heat exchanger core 1 can be shortened as a whole, it is possible to reduce the production cost of the heat exchanger core 1.

Further, in the method of producing the heat exchanger core 1, the inner wall 3a of the header passage 3 includes the first region 3a1 and the second region 3a2. The first region 3a1 is located on the one side in the extension direction of the plurality of internal passages 2, and the second region 3a2 is located on the another side in the extension direction of the plurality of internal passages 2 and has the inclined surface whose angle with respect to the extension direction of the plurality of internal passages 2 is not greater than 60 degrees, preferably not greater than 45 degrees.

With such method of producing the heat exchanger core 1, since the angle of the inclined surface of the second region 3a2 of the header passage 3 with respect to the extension direction of the internal passages 2 is not greater than 60 degrees, preferably not greater than 45 degrees, even if lamination is performed in the passage direction with priority given to the internal passages 2 over the header passage 3, it is possible to perform additive manufacturing on the heat exchanger core 1 including the header passage 3 as well while avoiding the overhang problem.

[Additive Manufacturing of Internal Passage 2 and Header Passage 3]

Figure 9:
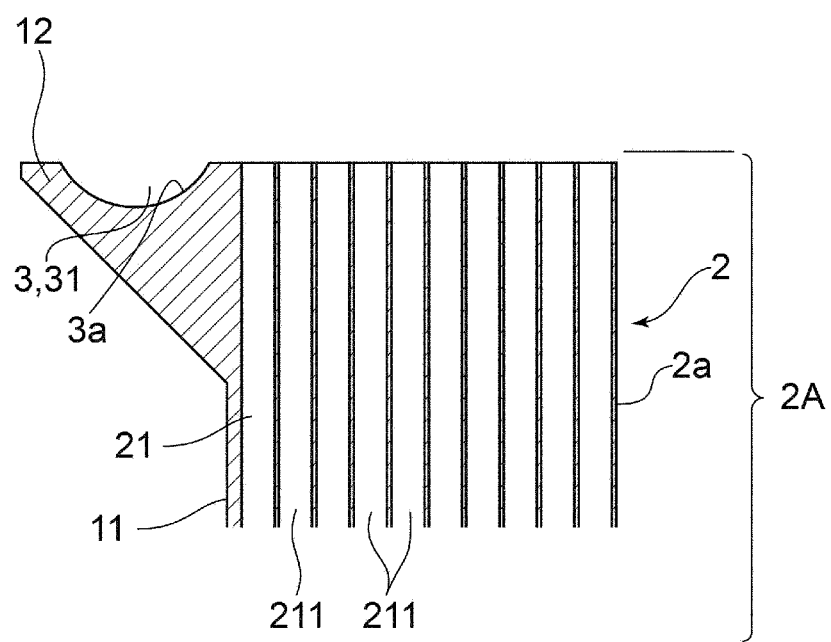
FIG. 9 is a view for describing a method of producing the heat exchanger core according to an embodiment.

Additive manufacturing of the internal passage 2 and the header passage 3 includes repetition of a series of cycles of a step of spreading metal powder, and melting and solidifying the metal powder by applying energy to the metal powder. As shown in FIG. 9, in the additive manufacturing, the header passage 3 is at least partially arranged within the formation range 2A of the plurality of internal passages 2 in the extension direction of the plurality of internal passages 2, and the portion (header 12) provided with the header passage 3 and the portion (body 11) provided with the plurality of internal passages 2 are formed by the series of cycles.

With such method of producing the heat exchanger core 1, since the header passage 3 is arranged within the formation range 2A in the extension direction of the plurality of internal passages 2, and the portion provided with the header passage 3 and the portion provided with the plurality of internal passages 2 are modeled by the series of cycles, it is possible to suppress the dimension of the heat exchanger core 1 in the extension direction of the internal passages 2 to downsize the heat exchanger core 1, and it is possible to shorten the modeling time of the heat exchanger core 1.

[Application Frequency of Energy]

In the step of melting and solidifying the metal powder, the application frequency of energy applied to the portion (header 12) provided with the header passage 3 is lower than that for the portion (body 11) provided with the plurality of internal passages 2. For example, if the metal powder is melted and solidified by laser irradiation in the additive manufacturing of the internal passages 2 and the header passage 3 described above, the number of times the metal powder is irradiated with lasers in the additive manufacturing of the portion (body 11) provided with the internal passages 2 is the same as the number of times the metal powder is spread, whereas the number of times of the metal powder is irradiated with lasers in the additive manufacturing of the portion (header 12) provided with the header passage 3 is halved the number of times the metal powder is spread. That is, the number of laser irradiations is set 1 for one time of spreading the metal powder in the additive manufacturing of the body 11, whereas the number of laser irradiations is set 1 for two times of spreading the metal powder in the additive manufacturing of the header 12. In other words, laser irradiation is performed every time the metal powder is spread in the additive manufacturing of the body 11, whereas the laser irradiation is skipped once every two times in the additive manufacturing of the header 12.

With such method of producing the heat exchanger core 1, since the application frequency of the energy applied to the portion provided with the header passage 3 is lower than that for the portion provided with the of internal passages 2, the modeling time per unit volume of the portion provided with the header passage 3 can be made shorter than that of the portion provided with the internal passages 2. Thus, since the molding time of the heat exchanger core 1 can be shortened as a whole, it is possible to reduce the production cost of the heat exchanger core 1. That is, in the above-described example, since laser irradiation is performed every time the metal powder is spread in the additive manufacturing of the body 11, whereas the laser irradiation is skipped once every two times in the additive manufacturing of the header 12, the molding time can be shortened by the one-time skip, and it is possible to reduce the production cost of the heat exchanger core 1.

Further, the application frequency of energy applied to the portion of the header passage 3 forming the first region 3a1 is lower than that for the portion forming the second region 3a2. For example, if the metal powder is melted and solidified by laser irradiation in the additive manufacturing of the header passage 3, the number of times the metal powder is irradiated with lasers in the additive manufacturing of the portion forming the second region 3a2 is the same as the number of times the metal powder is spread, whereas the number of times of the metal powder is irradiated with lasers in the additive manufacturing of the portion forming the first region 3a1 is halved the number of times the metal powder is spread. That is, the number of laser irradiations is set 1 for one time of spreading the metal powder in the additive manufacturing of the second region 3a2, whereas the number of laser irradiations is set 1 for two times of spreading the metal powder in the additive manufacturing of the first region 3a1. In other words, laser irradiation is performed every time the metal powder is spread in the additive manufacturing of the second region 3a2, whereas the laser irradiation is skipped once every two times in the additive manufacturing of the first region 3a1.

With such method of producing the heat exchanger core 1, since the application frequency of the energy applied to the portion forming the first region 3a1 is lower than that for the portion forming the second region 3a2, the modeling time per unit volume of the portion forming the first region 3a1 can be made shorter than that of the portion forming the second region 3a2. Thus, since the molding case of the heat exchanger core 1 can be shortened as a whole, it is possible to reduce the production cost of the heat exchanger core 1. That is, in the above-described example, since laser irradiation is performed every time the metal powder is spread in the additive manufacturing of the second region 3a2, whereas the laser irradiation is skipped once every two times in the additive manufacturing of the first region 3a1, the molding time can be shortened by the one-time skip, and it is possible to reduce the production cost of the heat exchanger core 1.

The present invention is not limited to the above-described embodiments, and also includes an embodiment obtained by modifying the above-described embodiments and an embodiment obtained by combining these embodiments as appropriate.

The contents described in the above embodiments would be understood as follows, for instance.

[1] A heat exchanger core (1) according to one aspect includes: a plurality of internal passages (2); and a header passage (3) communicating with the plurality of internal passages (2). An inner wall (3a) of the header passage (3) has greater surface roughness than passage walls (2a) of the plurality of internal passages (2).

For example, the Japan industry standards (JIS) specifies, as parameters representing surface roughness, definitions and displays of arithmetic average roughness (Ra), maximum height (Ry), ten-point average roughness (Rz), average interval of unevenness (Sm), average interval(S) of local peaks, and load length ratio (tp), and surface roughness is arithmetic mean of respective portions randomly extracted from the surface of an object.

With the heat exchanger core (1) according to the present disclosure, since the inner wall (3a) of the header passage (3) has the greater surface roughness than the passage walls (2a) of the plurality of internal passages (2), in the case where the heat exchanger core (1) is modeled by additive manufacturing, the modeling time per unit volume of the portion provided with the header passage (3) can be made shorter than that of the portion provided with the internal passages (2). Thus, since the molding time of the heat exchanger core (1) can also be shortened as a whole, it is possible to reduce the production cost of the heat exchanger core (1).

[2] The heat exchanger core (1) according to another aspect is the heat exchanger core (1) as defined in [1], where the plurality of internal passages (2) extend in parallel to each other, an inner wall (3a) of the header passage (3) includes: a first region (non-overhang region) (3a1) located on one side in the extension direction of the plurality of internal passages (2) and having first surface roughness; and a second region (overhang region) (3a2) located on another side in the extension direction and having second surface roughness which is not less than the first surface roughness, and the first surface roughness of the inner wall (3a) of the header passage (3) is greater than surface roughness of the passage walls (2a) of the plurality of internal passages (2).

With such configuration, the second surface roughness of the second region (overhang region) (3a2) of the header passage (3) is not less than the first surface roughness of the first region (non-overhang region) (3a1), and the first region (non-overhang region) (3a1) of the header passage (3) is greater than the surface roughness of the passage walls (2a) of the plurality of internal passages (2).

Thus,
the second surface roughness of the second region (3a2) ≥the first surface roughness of the first region (3a1)>the surface roughness of the passage walls (2a) of the plurality of internal passages (2)
is obtained.

That is, the first surface roughness of the first region (non-overhang region) (3a1) is equal to or less than the second surface roughness of the second region (overhang region) (3a2), and the modeling time per unit area of a portion provided with the first region (3a1) can be made shorter than that of a portion provided with the plurality of internal passages (2). Thus, since the molding time of the heat exchanger core (1) can also be shortened as a whole, it is possible to reduce the production cost of the heat exchanger core (1).

[3] The heat exchanger core (1) according to another aspect is the heat exchanger core (1) as defined in [1] or [2], where the header passage (3) is at least partially arranged in a formation range (2A) of the plurality of internal passages (2) in an extension direction of the plurality of internal passages (2).

With such configuration, since the header passage (3) is arranged within the formation range (2A) of the plurality of internal passages (2) in the extension direction of the plurality of internal passages (2), it is possible to suppress the dimension of the heat exchanger core (1) in the extension direction of the plurality of internal passages (2) to downsize the heat exchanger core (1).

[4] The heat exchanger core (1) according to another aspect is the heat exchanger core (1) as defined in any one of [1] to [3], where a partition wall (4a) between the header passage (3) and an intermediate passage (4) through which another fluid flows is along an extension direction of the plurality of internal passages (2).

With such configuration, the partition wall (4a) for separating the different fluids does not have an overhang shape, and thus the partition wall (4a) can be thinned. Thus, the header passage (3) can be moved inward toward an arrangement region of the plurality of internal passages (2), and it is possible to downsize the heat exchanger core (1).

[5] The heat exchanger core (1) according to another aspect is the heat exchanger core (1) as defined in any one of [1] to [3], that includes: an intermediate passage (4) disposed adjacent to ends of the plurality of internal passages (2). An inner wall (3a) of the header passage (3) includes a curved surface (3a3) having an arc shape, and a partition wall (4a) includes a part of the curved surface (3a3) on a surface of the partition wall (4a), and the curved surface (3a3) has a curvature center (3a31) located within a formation range (4A) of the intermediate passage (4) in an extension direction of the plurality of internal passages (2).

With such configuration, on the inner wall of the header passage (3) having the arc-shaped curved surface (3a3), it is possible to set a tangent direction of the arc shape along the extension direction of the plurality of internal passages (2), and the partition wall (4a) can be thinned by the simple header passage shape.

[6] The heat exchanger core (1) according to another aspect is the heat exchanger core (1) as defined in [1], where the plurality of internal passages (2) extend in parallel to each other, whereas the header passage (3) communicates with the plurality of internal passages (2) at ends of the plurality of internal passages (2) in an extension direction of the plurality of internal passages (2), and an inner wall (3a) of the header passage (3) includes: a first region (3a1) located on one side in the extension direction of the plurality of internal passages (2); and a second region (3a2) located on another side in the extension direction and having an inclined surface whose angle with respect to the extension direction is not greater than 60 degrees.

With such configuration, since the angle of the inclined surface of the second region (3a2) of the header passage (3) with respect to the extension direction of the plurality of internal passages (2) is not greater than 60 degrees, even if the extension direction of the plurality of internal passages (2) is the lamination direction with priority given to the plurality of internal passages (2) over the header passage (3), it is possible to perform additive manufacturing on the heat exchanger core (1) including the header passage (3) as well while avoiding the overhang problem.

Further, the top and bottom of the heat exchanger core (1) can be determined based on where the second region (3a2) of the header passage (3) is located, making it possible to reduce the possibility of mistakenly installing the top and bottom of the heat exchanger core (1).

[7] The heat exchanger core (1) according to another aspect is the heat exchanger core (1) as defined in [6], where the header passage (3) is at least partially arranged within a formation range (2A) of the plurality of internal passages (2) in an extension direction of the plurality of internal passages (2).

With such configuration, since the header passage (3) is arranged within the formation range (2A) of the plurality of internal passages (2) in the extension direction of the plurality of internal passages (2), it is possible to suppress the dimension of the heat exchanger core (1) in the extension direction of the plurality of internal passages (2) to downsize the heat exchanger core (1). Since the header passage (3) is formed within the formation range (2A) of the plurality of internal passages (2) in the extension direction of the plurality of internal passages (2), the overhang of the header passage (3) causes the problem. However, the overhang problem can be solved by the above configuration [6]. Thus, it is possible to efficiently produce the compact heat exchanger core (1) by additive manufacturing, while avoiding the overhang problem.

[8] The heat exchanger core (1) according to another aspect is the heat exchanger core (1) as defined in [6] or [7], where the heat exchanger core (1) includes a pair of the header passages (3) respectively located on both end sides of the plurality of internal passages (2), and the second region (3a2) of the pair of the header passages (3) is disposed on the same side with respect to the first region (3a1).

With such configuration, since the second regions (3a2) of the pair of header passages (3) are disposed on the same side with respect to the first region (3a1), even if the extension direction of the plurality of internal passages (2) is the lamination direction with priority given to the plurality of internal passages (2) over the header passage (3), it is possible to perform additive manufacturing on the heat exchanger core (1) including the pair of header passages (3) as well while avoiding the overhang problem. Further, the top and bottom of the heat exchanger core (1) can be determined based on where the second region (3a2) of the header passage (3) is located, making it possible to reduce the possibility of mistakenly installing the top and bottom of the heat exchanger core (1).

[9] The heat exchanger core (1) according to still another aspect is the heat exchanger core (1) as defined in any one of [6] to [8], where the first region (3a1) is formed into a groove type whose cross section is formed into an arc shape.

With such configuration, since the first region (3a1) is formed into the groove type whose cross section is formed into the arc shape, it is possible to suppress the thickness of the first region (3a1) while ensuring a passage cross-sectional area larger than that of the groove type having the rectangular cross section, the groove type having the inverted triangular cross section, or the like.

The heat exchanger core (1) according to another aspect is the heat exchanger core (1) as defined in any one of [1] to [9], that includes a body (11) including the plurality of internal passages (2); and a header (12) including the header passage (3) on at least one end side of the body (11). At least a part of the header passage (3) is located in a region which is dislocated outward from an arrangement region of the plurality of internal passages (2) in a planar view seen from an extension direction of the plurality of internal passages (2). The body (11) has a body side surface extending along the extension direction of the plurality of internal passages (2) in a section closer to the arrangement region than a portion of the header passage (3) farthest away from the arrangement region to outside in the planar view.

With such configuration, since the body (11) has the body side surface extending along the extension direction of the plurality of internal passages (2) in the section closer to the arrangement region than the portion of the header passage (3) farthest away from the arrangement region to the outside in the planar view seen from the extension direction of the plurality of internal passages (2), it is possible to suppress a distance between the arrangement region and the body side surface. Thus, it is possible to suppress the thickness of the body side surface, and it is possible to reduce the weight of the heat exchanger core (1).

[11] The heat exchanger core (1) according to another aspect is the heat exchanger core (1) as defined in [10], that includes: an intermediate passage (4) for causing the plurality of internal passages (2) to communicate with the header passage (3). An outer wall (top wall) (116) separating the intermediate passage (4) from the outside is recessed toward an extension direction of the intermediate passage (4) with respect to the header (12).

With such configuration, since the outer wall (top wall) (116) separating the intermediate passage (4) from the outside is recessed toward the extension direction of the intermediate passage (4) with respect to the header (12), it is possible to reduce the weight of an intermediate region as compared with a case where the outer wall (top wall) (116) is not recessed toward the extension direction of the intermediate passage (3).

[12] The heat exchanger core (1) according to another aspect is the heat exchanger core (1) as defined in [11], where the header passage (3) is at least partially located opposite to the plurality of internal passages (2) across the intermediate passage (4) in the extension direction.

With such configuration, it is possible to solve even problems that the thickness of the outer wall separating the intermediate passage (4) from the outside becomes excessive and a cost increases, while sufficiently securing the cross-sectional area of the header passage (3).

[13] The heat exchanger core (1) according to another aspect is the heat exchanger core (1) as defined in any one of [1] to [12], where there are a plurality of the header passages (3), and the plurality of header passages (3) have different passage opening shapes.

With such configuration, when the pipe is connected to the heat exchanger core (1), it is possible to prevent a connection error thanks to the difference in the passage opening shapes.

[14] The heat exchanger core (1) according to another aspect is the heat exchanger core (1) as defined in any one of to [12], that includes a connection pipe (13) projecting from the header (12) in an extension direction of the header passage (3). The connection pipe (13) includes a connection passage (5) communicating with the header passage (3).

With such configuration, it is possible to easily connect a fluid supply pipe (16) connected to a fluid supply source or a fluid discharge pipe (17) connected to a fluid discharge destination to the heat exchanger core (1) (connection pipe (13)).

[15] A heat exchanger (6) according to one aspect includes: the heat exchanger core (1) as defined in [14]; and a housing (7) in which the heat exchanger core (1) is housed. The housing (7) includes: a fitting recess (71) into which the connection pipe (13) is fitted when the heat exchanger core (1) is housed; and a passage (72) with which the connection passage (5) communicates when the connection pipe (13) is fitted into the fitting recess (71).

With such configuration, since the heat exchanger core (1) is housed in the housing (7) and the connection passage (5) communicates with the passage (72) by fitting the connection pipe (13) into the fitting recess (71), it is possible to connect the connection passage (5) to the passage (72) by housing the heat exchanger core (1) in the housing (7).

[16] A method of producing a heat exchanger core (1) according to one aspect is a method of producing a heat exchanger core (1) that includes a plurality of internal passages (2) extending in parallel to each other, and a header passage (3) communicating with the plurality of internal passages (2), which includes: a step of forming the plurality of internal passages (2) by performing additive manufacturing along an extension direction of the plurality of internal passages (2); and a step of forming the header passage (3) by performing the additive manufacturing along the extension direction. An inner wall (3a) of the header passage (3) has greater surface roughness than passage walls (2a) of the plurality of internal passages (2).

With the method of producing the heat exchanger core (1) according to the present disclosure, since the inner wall (3a) of the header passage (3) has the greater surface roughness than the passage walls (2a) of the internal passages (2), a modeling time per unit volume in the step of forming the header passage (3) can be made shorter than that of the portion provided with the plurality of internal passages (2). Thus, since the molding time of the heat exchanger core (1) can be shortened as a whole, it is possible to reduce the production cost of the heat exchanger core (1).

[17] The method of producing the heat exchanger core (1) according to another aspect is the method of producing the heat exchanger core (1) as defined in the above [16], where the inner wall (3a) of the header passage (3) includes: a first region (3a1) located on one side in the extension direction of the plurality of internal passages (2); and a second region (3a2) located on another side in the extension direction and having an inclined surface whose angle with respect to the extension direction is not greater than 60 degrees.

With such producing method, since the angle of the inclined surface of the second region (3a2) of the inner wall (3a) of the header passage (3) with respect to the extension direction of the plurality of internal passages (2) is not greater than 60 degrees, even if the extension direction of the plurality of internal passages (2) is the lamination direction with priority given to the plurality of internal passages (2) over the header passage (3), it is possible to perform additive manufacturing on the heat exchanger core (1) including the header passage (3) as well while avoiding the overhang problem.

[18] The method of producing the heat exchanger core (1) according to another aspect is the method of producing the heat exchanger core (1) as defined in the or [17], where the additive manufacturing includes repetition of a series of cycles of a step of spreading metal powder, and a step of melting and solidifying the metal powder by applying energy to the metal powder, the header passage (3) is at least partially arranged in a formation range (2A) of the plurality of internal passages (2) in the extension direction, and a portion provided with the header passage (3) and a portion provided with the plurality of internal passages (2) are modeled by the series of cycles.

With such producing method, since the header passage (3) is arranged within the formation range (2A) of the plurality of internal passages (2) in the extension direction of the plurality of internal passages (2), and the portion provided with the header passage (3) and the portion provided with the plurality of internal passages (2) are modeled by the series of cycles, it is possible to suppress the dimension of the heat exchanger core (1) in the extension direction of the plurality of internal passages (2) to downsize the heat exchanger core (1), and it is possible to shorten the modeling time of the heat exchanger core (1).

[19] The heat exchanger core (1) according to another aspect is the method of producing the heat exchanger core (1) as defined in [18], where application frequency of energy applied to the portion provided with the header passage (3) in the step of melting and solidifying the metal powder is lower than that for the portion provided with the plurality of internal passages (2).

With such producing method, since the application frequency of the energy applied to the portion provided with the header passage (3) is lower than that for the portion provided with the plurality of internal passages (2), the modeling time per unit area of the portion provided with the header passage (3) can be made shorter than that of the portion provided with the plurality of internal passages (2). Thus, since the molding time of the heat exchanger core (1) can be shortened as a whole, it is possible to reduce the production cost of the heat exchanger core (1).

REFERENCE SIGNS LIST

1 Heat exchanger core
11 Body
111 Outer wall (bottom wall)
112 Outer wall (side wall)
116 Outer wall (top wall)
12 Header
121 First header 122 Second header
123 Third header
124 Fourth header
13 Connection pipe
131 First connection pipe
132 Second connection pipe
133 Third connection pipe
134 Fourth connection pipe
14 Support
15 Adapter
16 Fluid supply pipe
17 Fluid discharge pipe
2 Internal passage
2A Formation range of internal passage
2a Passage wall
21 First passage
21a Passage wall
211 Divided passage
22 Second passage
22a Passage wall
221 Divided passage
23 Partition wall
24 Dividing wall
3 Header passage
3a Inner wall of header passage
3a1 First region
3a2 Second region
3a3 Curved surface
3a31 Curvature center
31 First header passage
31a Inner wall
32 Second header passage
32a: Inner wall
33 Third header passage
33a Inner wall
34 Fourth header passage
34a Inner wall
4 Intermediate passage
4A Formation range
4a Partition wall
41 First intermediate passage
42 Second intermediate passage
42a Partition wall
5 Connection passage
5a Inner wall of connection passage
5a3 Third region
5a4 Fourth region
6 Heat exchanger
7 Housing
71 Fitting recess
72 Passage

The invention claimed is:
1. A heat exchanger core comprising:
a plurality of internal passages extending in parallel to each other; and
a header passage communicating with the plurality of internal passages at ends of the plurality of internal passages in an extension direction of the internal passages,
wherein an inner wall of the header passage has greater surface roughness than passage walls of the plurality of internal passages,
wherein an inner wall of the header passage includes:
a first region located on one side in the extension direction of the plurality of internal passages; and
a second region located on another side in the extension direction and having an inclined surface whose angle with respect to the extension direction is not greater than 60 degrees;
wherein a partition wall between the header passage and an internal passage through which another fluid flow is along an extension direction of the plurality of internal passages.
2. The heat exchanger core according to claim 1,
wherein the header passage is at least partially arranged within a formation range of the plurality of internal passages in an extension direction of the plurality of internal passages.
3. The heat exchanger core according to claim 1,
wherein the heat exchanger core includes a pair of the header passages respectively located on both end sides of the plurality of internal passages, and the second region of the pair of the header passages is disposed on the same side with respect to the first region.
4. The heat exchanger core according claim 1,
wherein the first region is formed into a groove type whose cross section is formed into an arc shape.
5. The heat exchanger core according to claim 1, comprising:
a body including the plurality of internal passages; and
a header including the header passage on at least one end side of the body,
wherein at least a part of the header passage is located in a header region which is dislocated outward from an arrangement region of the plurality of internal passages in a planar view seen from an extension direction of the plurality of internal passages, and
wherein the body has a body side surface extending along the extension direction of the plurality of internal passages in a section closer to the arrangement region than a portion of the header region farthest away from the arrangement region to outside in the planar view.
6. The heat exchanger core according to claim 5, comprising:
an intermediate passage for causing the plurality of internal passages to communicate with the header passage,
wherein an outer wall separating the intermediate passage from the outside is recessed toward a side of the internal passages along an extension direction of the intermediate passage with respect to the header.
7. The heat exchanger core according to claim 6,
wherein the header passage is at least partially located opposite to the plurality of internal passages across the intermediate passage in the extension direction.
8. The heat exchanger core according to claim 1,
wherein there are a plurality of the header passages, and
wherein the plurality of header passages have different passage opening shapes.
9. The heat exchanger core according to claim 1,
wherein the plurality of internal passages extend in parallel to each other,
wherein an inner wall of the header passage includes:
a first region located on one side in an extension direction of the plurality of internal passages and having first surface roughness; and
a second region located on another side in the extension direction and having second surface roughness which is not less than the first surface roughness, and
wherein the first surface roughness of the inner wall of the header passage is greater than surface roughness of the passage walls of the plurality of internal passages.

10. The heat exchanger core according to claim 1,
wherein the header passage is at least partially arranged in a formation range of the plurality of internal passages in an extension direction of the plurality of internal passages.

11. The heat exchanger core according to claim 1, comprising:
an intermediate passage disposed adjacent to ends of the plurality of internal passages,
wherein an inner wall of the header passage includes a curved surface having an arc shape, and a partition wall between the header passage and an intermediate passage through which another fluid flows includes a part of the curved surface on a surface of the partition wall, and
wherein the curved surface has a curvature center located within a formation range of the intermediate passage in an extension direction of the plurality of internal passages.

12. The heat exchanger core according to claim 5, comprising:
a connection pipe projecting from the header in an extension direction of the header passage,
wherein the connection pipe includes a connection passage communicating with the header passage.

13. A heat exchanger, comprising:
the heat exchanger core according to claim 12; and
a housing in which the heat exchanger core is housed,
wherein the housing includes:
a fitting recess into which the connection pipe is fitted when the heat exchanger core is housed; and
a passage with which the connection passage communicates when the connection pipe is fitted into the fitting recess.

14. A heat exchanger core comprising:
a plurality of internal passages extending in parallel to each other; and
a header passage communicating with the plurality of internal passages at ends of the plurality of
internal passages in an extension direction of the internal passages,
an intermediate passage disposed adjacent to ends of the plurality of internal passages,
wherein an inner wall of the header passage has greater surface roughness than passage walls of the plurality of internal passages,
wherein an inner wall of the header passage includes:
a first region located on one side in the extension direction of the plurality of internal passages; and
a second region located on another side in the extension direction and having an inclined surface
whose angle with respect to the extension direction is not greater than 60 degrees;
wherein an inner wall of the header passage includes a curved surface having an arc shape, and a
partition wall between the header passage and an intermediate passage through which another fluid flows
includes a part of the curved surface on a surface of the partition wall, and
wherein the curved surface has a curvature center located within a formation range of the
intermediate passage in an extension direction of the plurality of internal passages.

15. The heat exchanger core according to claim 14,
wherein the header passage is at least partially arranged within a formation range of the plurality of
internal passages in an extension direction of the plurality of internal passages.

16. The heat exchanger core according to claim 14,
wherein the heat exchanger core includes a pair of the header passages respectively located on both
end sides of the plurality of internal passages, and the second region of the pair of the header passages is
disposed on the same side with respect to the first region.

17. The heat exchanger core according claim 14,
wherein the first region is formed into a groove type whose cross section is formed into an arc shape.

18. The heat exchanger core according to claim 14, comprising:
a body including the plurality of internal passages; and
a header including the header passage on at least one end side of the body,
wherein at least a part of the header passage is located in a header region which is dislocated outward
from an arrangement region of the plurality of internal passages in a planar view seen from an extension
direction of the plurality of internal passages, and
wherein the body has a body side surface extending along the extension direction of the plurality of
internal passages in a section closer to the arrangement region than a portion of the header region farthest
away from the arrangement region to outside in the planar view.

19. The heat exchanger core according to claim 18, comprising:
an intermediate passage for causing the plurality of internal passages to communicate with the
header passage,
wherein an outer wall separating the intermediate passage from the outside is recessed toward a side
of the internal passages along an extension direction of the intermediate passage with respect to the header.

20. The heat exchanger core according to claim 19,
wherein the header passage is at least partially located opposite to the plurality of internal passages
across the intermediate passage in the extension direction.

21. The heat exchanger core according to claim 14,
wherein there are a plurality of the header passages, and
wherein the plurality of header passages have different passage opening shapes.

22. The heat exchanger core according to claim 14,
wherein the plurality of internal passages extend in parallel to each other,
wherein an inner wall of the header passage includes:
a first region located on one side in an extension direction of the plurality of internal passages
and having first surface roughness; and
a second region located on another side in the extension direction and having second surface
roughness which is not less than the first surface roughness, and
wherein the first surface roughness of the inner wall of the header passage is greater than surface
roughness of the passage walls of the plurality of internal passages.

23. The heat exchanger core according to claim 14,
wherein the header passage is at least partially arranged in a formation range of the plurality of
internal passages in an extension direction of the plurality of internal passages.

24. The heat exchanger core according to claim 18, comprising:
- a connection pipe projecting from the header in an extension direction of the header passage,
- wherein the connection pipe includes a connection passage communicating with the header passage.

* * * * *